Jan. 26, 1937.  J. A. BRADLEY  2,068,842
METHOD AND APPARATUS FOR THE TREATMENT OF ORES AND THE GENERATION OF GAS
Filed Oct. 1, 1934  3 Sheets-Sheet 1
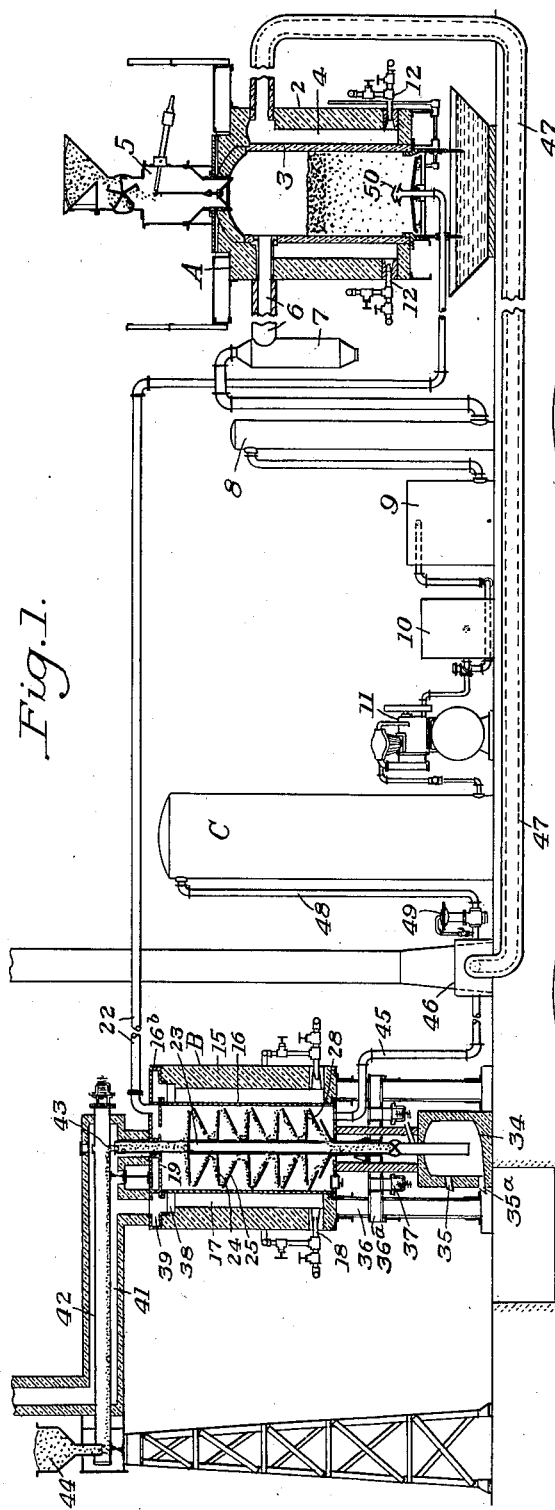
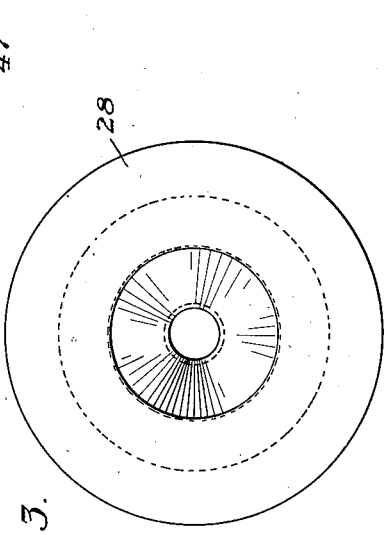
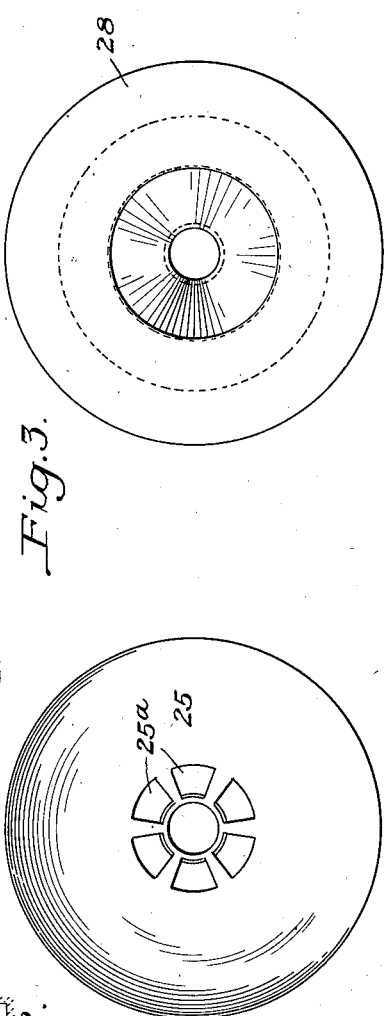
INVENTOR
James A. Bradley
by his attorneys Jan. 26, 1937.                J. A. BRADLEY                2,068,842
METHOD AND APPARATUS FOR THE TREATMENT OF ORES AND THE GENERATION OF GAS
Filed Oct. 1, 1934        3 Sheets-Sheet 3
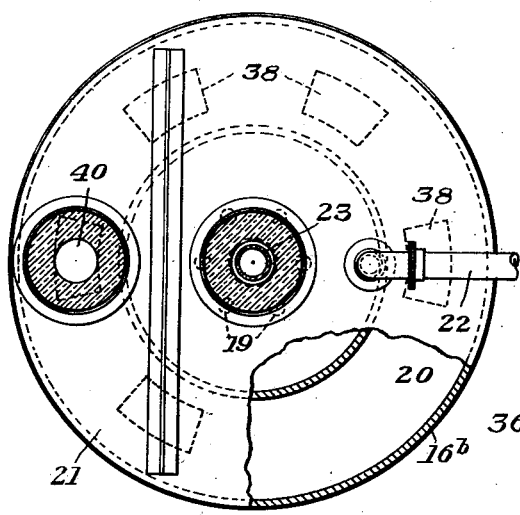
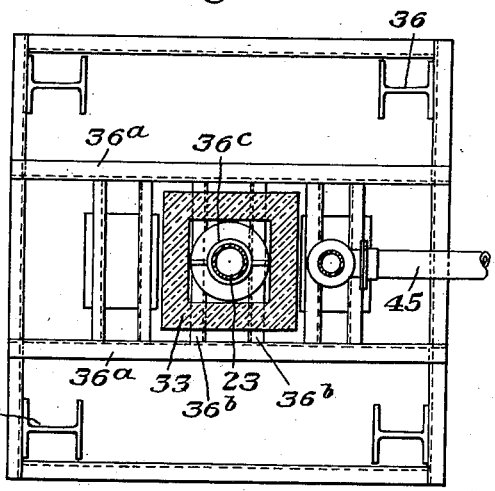
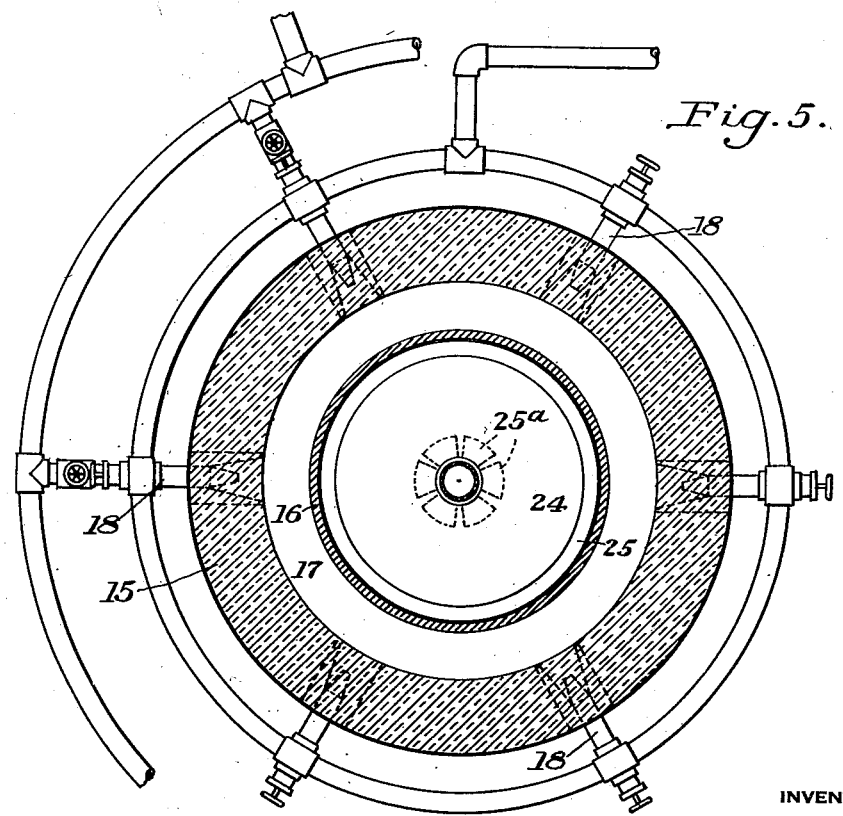
INVENTOR Patented Jan. 26, 1937

2,068,842

UNITED STATES PATENT OFFICE 2,068,842

METHOD AND APPARATUS FOR THE TREATMENT OF ORES AND THE GENERATION OF GAS

James A. Bradley, Pittsburgh, Pa.

Application October 1, 1934, Serial No. 746,347

21 Claims. (Cl. 75—35)

This invention relates to a method and apparatus for the direct reduction of oxide-containing ores and/or for the production of gas, and constitutes an improvement on the invention disclosed in the application of James D. Bradley, Serial No. 627,340, filed August 30, 1932.

According to the general operation of the present arrangement, a carbonaceous fuel, such as coal, is charged into a retort. In the upper part of this retort, the carbonaceous material is subjected to the usual distillation, and in the lower part of the retort, there is maintained an incandescent bed of coke which is ultimately reduced to ash. The retort is heated by gas burners so arranged as to heat the exterior of the retort. The hydrocarbon and CO gases produced in the retort are subjected to the usual cleaning processes and then stored. Some of the gases necessary for carrying on the cycle of operation are withdrawn from the storage tank, heated, and then passed through an ore-reducing chamber through which a mass of oxide ore in a fine state of subdivision is continuously passing, the ore being heated from gas burners which may also be supplied by gas furnished by the storage tank. Hydrocarbon and CO gases coming into contact with the heated ore, remove the oxygen from the ore, forming $CO_2$ and $H_2O$. The reduced ore is ultimately discharged from the reducing chamber in the form of finely divided metal particles. Where the principal object of the installation is to reduce ore, the ore may be further treated to conglomerate the individual particles of metal. Where the invention is used primarily for gas production, the hot metal particles can be immediately re-oxidized for recirculation through the reducing chamber. The $CO_2$ gas and the $H_2O$ vapor formed in the reducing chamber are led back into the coking retort where they come into contact with the incandescent coke, being reconverted into combustible gases, the $CO_2$ being reduced to CO, and the $H_2O$ being converted to HC gas and CO.

The system, once it has been set into operation, is carried on without appreciable atmospheric air being introduced into the system, so that there is no dilution of the combustible or reducing gases with atmospheric nitrogen. The reaction temperatures in the reducing chamber are, therefore, below the fusing point of the metal, which is ultimately obtained. Used as an ore-reducing apparatus or method, it functions efficiently to reduce the ore at a very low cost, and a considerable amount of gas can be produced as a by-product. Used as a gas producer, the ore which is reduced is re-oxidized and recirculated, serving as a means for bringing oxygen into the system without any appreciable volume of atmospheric nitrogen. A considerable volume of gas can be produced from low grade fuels. The cost of constructing and operating the method and apparatus is very small compared with present methods for the reduction of ore or for the production of gas. Small deposits of ore, as, for instance, iron ore, which cannot be economically worked because of being too remote from blast furnaces, and being too small to justify the installation of blast furnaces, can be very economically worked, using the method and apparatus herein described.

The present invention is an improvement over the invention disclosed in the said application of James D. Bradley, first, in respect to the method of utilizing waste heat from the coking retort, and, second, in the particular construction and operation of the ore-reducing unit.

The invention may be readily understood by reference to the accompanying drawings, in which Figure 1 is a more or less schematic outlay of a complete plant constructed to embody the present invention;

Figure 2 is a detail view of one of the conical baffles or plates comprising a part of the ore reducer;

Figure 3 is a detail view showing the lowermost baffle or inclined plate of the series inside the ore-reducing unit;

Figure 5 is a transverse horizontal section in the plane of line V—V of Figure 4;

Figure 6 is a similar transverse horizontal section in the plane of line VI—VI of Figure 4; and Figure 7 is a transverse horizontal section in the plane of line VII—VII of Figure 4.

Figure 4:
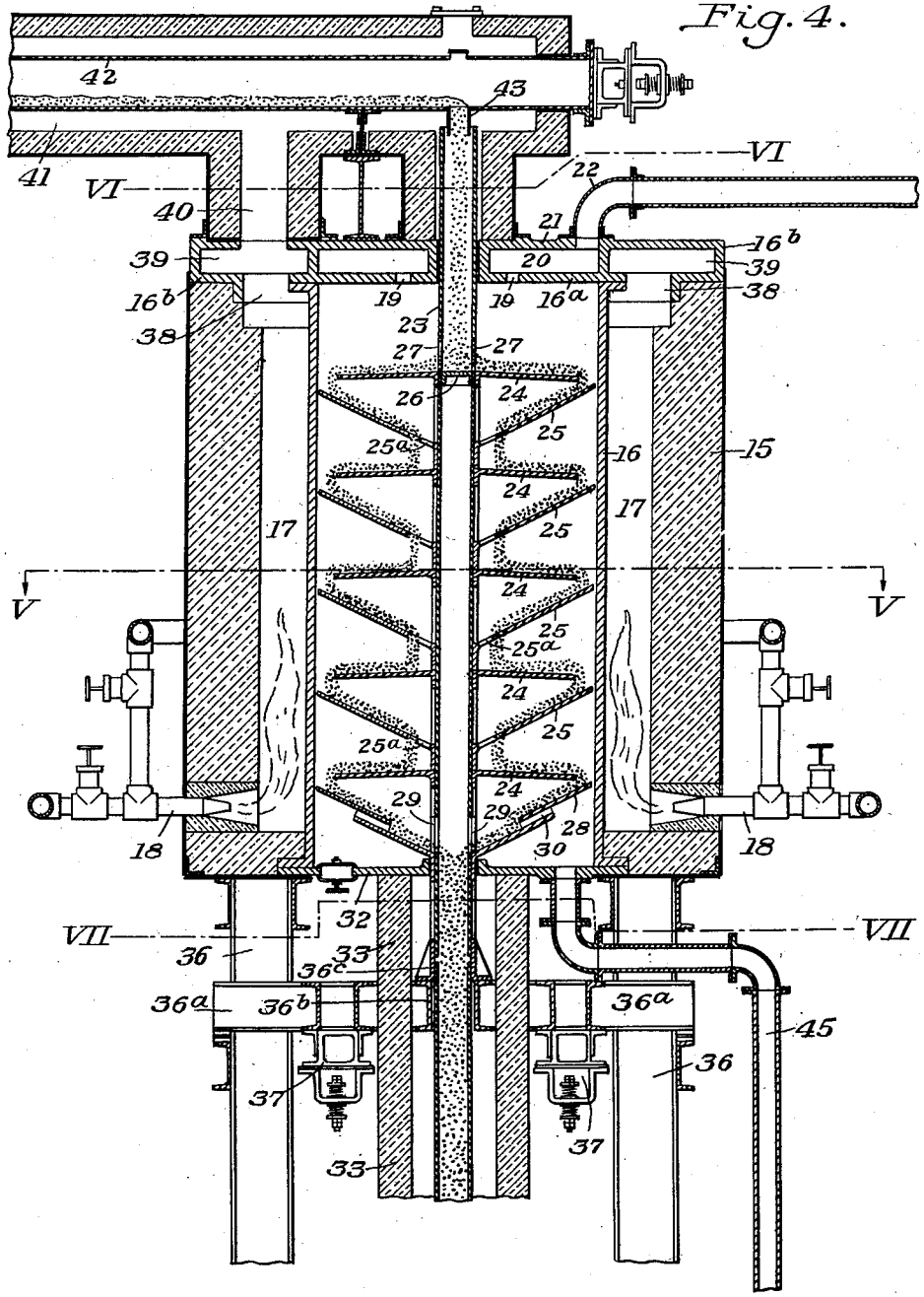
Figure 4 is a transverse vertical section through the ore-reducing unit.

Referring first to the general arrangement shown in Figure 1, A designates the gas producer or retort, and B designates the ore-reducing unit. The gas storage receptacle is designated C.

The producer or retort A comprises an outer refractory wall 2 having a retort or closed chamber 3 therein. A combustion space 4 is provided between the outside of the retort 3 and the inside of the main wall 2. The walls of the retort 3 are, of course, formed of a refractory or refractory metal having a relatively high thermal conductivity, while the outer walls 2 are, of course, of an insulating character. The retort is provided with a customary type of fuel feeding mechanism designated generally as 5, this mechanism being of the type well known in the gas producer art, whereby fuel can be fed intermittently or continuously into the retort in regulated amounts without appreciable loss of gas. The lower end of the retort extends down into a water seal. Leading from the upper portion of the retort is a gas passage 6 that leads first to a condensate trap 7, thence to a cooler 8. From the cooler 8, the gas passes through a tar washer 9 and through a purifier or desulphurizer 10. From the purifier the gas is led to a compressor 11. The compressed gas is forced into the reservoir or storage tank C.

For heating the retort I have shown a series of burners 12. These burners may be supplied, once the system has been set into operation, from gas conducted to them from the storage tank C.

The ore-reducing unit is one designed to effect the continuous movement and agitation of the ore without having any moving parts. Its construction will be readily understood by reference to Figure 4, particularly, and this figure in conjunction with Figures 2, 3, 5, 6 and 7. The ore-reducing unit comprises a refractory outer wall structure 15. Within the outer wall and spaced therefrom is a metal shell 16, the shell 16 preferably being cylindrical. Inside the wall 15 and around the shell 16 is a combustion or heating space 17. An annular series of burners, designated 18, is provided for supplying heat to the space 17. The burners 18 are preferably gas burners and after the system has been put into operation, the gas may be supplied from the reservoir C. The top of the shell 16 is closed by a plate 16a having a series of ports 19 therethrough, these ports communicating with a gas circulating space 20. The space 20 is closed by a top plate 21, and at 22 is a gas discharge pipe leading from the space 20. Extending down through the top plates 16a and 21 is a central tube 23. This central tube carries a plurality of spaced horizontal discs or plates 24. Below each horizontal disc or plate 24 is a cone-shaped disc 25. The plates 25 have a diameter slightly greater than the diameter of the discs 24, the discs 24 having a diameter somewhat less than the interior diameter of the shell 16. Within the tube 23 at the level of the uppermost plate 24 is a plug 26, and above this plug 26 is a plurality of lateral openings 27. The plates 25 as shown in Figure 2, are provided with an annular series of openings 25a through which granular or loose material which gravitates down the plates 25 toward the tube 23, can fall onto the next succeeding horizontal plate 24. While I have described the plates 24 as being horizontal, they may, as shown, have a very slight downward inclination toward their outer edges.

Below the lowermost horizontal plate 24, there is a conical hopper-like member 28 which is secured to the central tube 23 near the bottom of the shell 16. This member 28 is arranged to direct the material which passes through the reducing chamber, through ports 29 in the tube 23. The member 28 is provided with lateral passages 30 to facilitate the circulation of gases.

The bottom of the shell 16 is closed by a plate 32, and the tube 23 passes down through the plate 32. The downwardly extending extension of this tube is preferably surrounded by a refractory insulating wall 33. I have shown the lower end of this tube as terminating in a receptacle 34 having a slag discharge spout 35 and a metal discharge opening 35a. In an ore-reducing process, the granulated ore which discharges through the central tube 23 into the receptacle 34 falls into a bath of molten slag in the receptacle 34 which serves to flux the reduced ore particles and fuse them together into a molten liquid which can be drained out of the tap hole 35a at regular intervals. Where the system is used as a gas producer, the receptacle 34 should constitute an oxidizing chamber where the reduced ore would be again oxidized for recirculation through the reducing unit.

The whole reducing unit is carried on a structural frame 36. Loosely set on the frame 36 is a horizontal frame 36a. Attached to this horizontal frame structure are electric vibrators 37, these vibrators being of a type well known in the art and forming no part of the present invention. The vibrators as illustrated are arranged to transmit a vertical vibration to the horizontal frame 36a. The amplitude and frequency of vibration are adjustable, and the frequency is ordinarily of the order of several hundred vibrations per minute. The horizontal frame 36a includes transverse members 36b which are best shown in Figure 7. These members 36b have brackets 36c rigidly secured thereto, these brackets being secured to the central tube. By reason of this arrangement, the vertical vibrations of the horizontal frame 36a are transmitted to the vertical central supporting tube, which tube carries the vertical series of baffles or baffle plates as previously described. Where the central tube passes through the bottom plate 32, the fit is preferably close enough to prevent any substantial escape of the reducing gas, but loose enough so that the vibrations of the central tube will not be transmitted to any appreciable extent to the bottom plate 32, or to the shell 16 or to the refractory wall 15. Furthermore, it will be noted that the baffle plates within the chamber 16 are of less diameter than the inside diameter of the chamber, so that vibrations of the baffle plates will not be transmitted to the shell 16 through contact of these baffles with the shell.

One well known type of vibrator adapted for this purpose is sold under the trade name of "Syntron" and is manufactured by the Syntron Company of Pittsburgh, Pa. Such vibrators, comprising generally a housing which is adapted to be clamped to the structure 36a, comprise an electromagnet and a vibrator plate limited in its movement between springs so that vibration of the plate transmits a vibration to the whole frame structure on which the unit is mounted. Such vibrators are well known to those skilled in the art, and are extensively used on conveyors for coal and other material.

Referring to Figure 4, it will be seen that the metal structure which provides the plates 16a and 21, extends laterally beyond the shell 16 and forms a closure for the combustion space 17. This extended portion of the metal structure, designated generally as 16b has openings 38 in the bottom face thereof through which gases of combustion from the combustion chamber may be carried into an annular duct 39. The duct 39 communicates with a flue passage 40. In Figure 4, I have shown the flue passage 40 as having a horizontal passage 41. In the passage 41 is a vibrating conveyor tube 42 having a discharge spout 43 through which material is discharged into the top of the central pipe 23. Figure 1 illustrates a hopper arrangement 44 for discharging material into the conveyor, the arrangement being such that the material in the conveyor 42 is preheated by waste gases from the combustion space 17. Opening into the bottom of the shell 16 through the plate 32 is a supply pipe 45 through which reducing gases stored in the reservoir C may be charged into the reducing chamber.

There is preferably provided intermediate the storage tank C and the ore-reducing unit B, a gas heater unit 46. Waste heat and gases are led from the combustion space 4 of the retort through a duct or pipe 47, to the heat exchanger or gas heating unit 46. Gas from the storage tank C is removed through pipe 48, passing through a pressure regulator 49 into the preheater or heat exchanger 46. The pipe 45 carries the heated gas from the preheater 46 to the reducing unit B. The pipe 22 leading from the top of the reducing unit goes back to the coking retort or gas producer A, discharging into the lower part of the inside of the retort through a tuyere 50 which tuyere is just below the incandescent coke area of the retort.

The parts are so constructed that there is no appreciable leakage of gas in the system, so that gas which is removed from the retort, after passing through the reducing unit, is returned to the retort.

The general operation of the ore-reducing unit is that the material is fed down the central pipe 23 with the vibrators 37 in operation, the volume of material being fed down the pipe 23 being sufficient to substantially prevent the escape of gas at the central tube 23. The material falling down the tube 23 strikes the plug 26 and is deflected laterally. The vibrations cause the finely granulated ore to flow out to the edge of the first plate 24, the material being continuously agitated by the vibrating action during such travel. The material then falls from the edge of the first plate 24 onto the conical plate 25. Gravity and vibration move the material toward the center, the material discharging onto the next plate 24 through the openings 25a in the inclined plates 25. In this manner, the material passes down over the series of horizontal and inclined plates or baffles. At the same time, heated reducing gas flows in a counter-direction to the flow of material, and it is brought into intimate contact with the material. A reaction temperature is maintained by the burning of gases in the combustion space 17, and in the preferred arrangement as shown, the ore is preheated by waste gases traveling through the horizontal flue 41 around the conveyor 42.

In the operation of the unit, the temperature of the ore is at all times kept high enough so that the reaction between the gases and the ore will take place, but at a temperature below that at which any substantial melting or sintering of the metallic particles will occur. In this way, it is assured that practically all of the particles will be brought into intimate contact with the reducing gases and that no unreduced particles will be sealed from contact with such gases by a surrounding shell of fused metal. By controlling the rate of vibration and the magnitude of vibration, the speed of movement or rate of flow of the material can be closely controlled so as to assure adequate time for complete reaction to occur. The vibration not only serves to effect the movement of the material, but serves to agitate the individual particles to bring different particles to the surface at different times and thereby give added opportunity for the reaction of gases and oxide-bearing material.

The operation of the system is as previously outlined in this specification. Carbonaceous material, such as coal, is fed into the retort or gas producer 3. Hydrocarbon vapors are distilled out of the coal, and the resulting coke is heated in the lower part of the retort to incandescence. The gases from the retort are carried, after proper treatment, into the reservoir C. From this reservoir, they are preheated and discharged into the bottom of the reducing unit. The reducing gas in the reducing unit has a flow counter to the flow of ore in the reducing unit. In the reducing unit the carbon monoxide (CO) is converted to carbon dioxide ($CO_2$) by taking oxygen out of the ore. The hydrocarbon gases are converted into water vapor ($H_2O$) and into carbon dioxide ($CO_2$). These reactions all require the removal of oxygen from the ore. The spent gases from the reducing chamber are carried back into the retort where they pass through the incandescent coke. The incandescent coke breaks up the water vapor into water gas and converts the carbon dioxide back to the monoxide stage. The generation of reducing gases is cumulative, and the longer the system is in operation the greater will be the amount of gas accumulated in the reservoir C. This accumulation obtains first by reason of the fact that fresh coal is continuously or intermittently charged into the retort, introducing an added volume of hydrocarbon vapors or gases. The passage of reducing gases through the oxide ore results in the removal of oxygen from the ore. This breaks up the hydrocarbon vapors by oxidation, resulting in a further increase in the volume of gases. The gases generate and accumulate without any substantial volume of atmospheric air with its dilution of nitrogen being taken into the system. By reason of the absence of any substantial volume of nitrogen in the reducing chamber, the reduction of ore occurs under more favorable conditions and at a lower temperature. Moreover, the resulting excess gas, if it is used for fuel, is relatively free of atmospheric nitrogen and, therefore, has a high heating value.

In the said application of James D. Bradley, the waste heat from the coking retort is used to heat the ore reducing unit. It will be noted that in the present system, the waste heat from the coking retort is used to preheat the reducing gas, and that the reducing unit is provided with burners. By reason of this arrangement, better control of the temperature conditions within the reducing unit can be secured than where all of the heat from the coking retort is utilized around the reducing unit. This is of particular advantage where there is any variation in the temperature of the waste gases from the coking unit, allowing more uniform temperatures to be maintained in the reducing unit.

As previously explained, the system may be operated primarily for ore reduction in which case gas is a by-product, or it may be operated primarily for the generation of gas, in which case the reduced ore may be again oxidized and again run through the reducing chamber, the method supplying oxygen for the gas without the attendant volume of atmospheric nitrogen.

One advantage of the present invention resides in the use of waste heat from the retort for preheating the gas going into the reducing unit. A second advantage of the invention resides in the construction and operation of the reducing unit. A third advantage of the invention resides in the utilization of waste heat from the reducing unit for preheating the ore.

While I have shown and described a particular apparatus for the carrying out of my invention, it will be understood that various changes and modifications may be made within the contemplation of my invention and under the scope of the following claims.

I claim:

1. The method of reducing ores, which comprises generating a reducing gas containing hydrogen and carbon in a retort, cleaning and storing the gas so generated, passing the gas so stored over comminuted ore particles which are in a state of agitation, utilizing waste heat from the retort to preheat the reducing gas, and passing the gas after it has been brought into contact with the ore back to the retort to convert it again into a reducing gas.

2. The method of reducing ores, which comprises generating a reducing gas containing hydrogen and carbon in a retort, cleaning and storing the gas so generated, passing the gas so stored over comminuted ore particles which are in a state of agitation, utilizing waste heat from the retort to preheat the reducing gas, passing the gas after it has been brought into contact with the ore back to the retort to convert it again into a reducing gas, applying heat to the ore particles while reducing gas is flowing thereover, and utilizing excess heat from the ore-heating operation to preheat the ore.

3. The method wherein combustible gas is generated and an oxide-bearing ore is reduced, comprising the steps of generating a combustible gas from a carbonaceous material in a gas retort, cleaning the gas so generated and storing it, conducting a portion of the stored gas into contact with finely divided heated ore particles to oxidize the gas and de-oxidize the ore, returning the oxidized gases back to the retort to convert them into combustible gases for recirculation through the cycle, and preheating the gas after it is removed from storage and before it is brought into contact with the heated ore.

4. The method wherein combustible gas is generated and an oxide-bearing ore is reduced, comprising the steps of generating a combustible gas from a carbonaceous material in a gas retort, cleaning the gas so generated and storing it, conducting a portion of the stored gas into contact with finely divided heated ore particles to oxidize the gas and de-oxidize the ore, returning the oxidized gases back to the retort to convert them into combustible gases for recirculation through the cycle, preheating the gas after it is removed from storage and before it is brought into contact with the heated ore, and utilizing some of the stored gas for heating the retort.

5. The method wherein combustible gas is generated and an oxide-bearing ore is reduced, comprising the steps of generating a combustible gas from a carbonaceous material in a gas retort, cleaning the gas so generated and storing it, conducting a portion of the stored gas into contact with finely divided heated ore particles to oxidize the gas and de-oxidize the ore, returning the oxidized gases back to the retort to convert them into combustible gases for recirculation through the cycle, preheating the gas after it is removed from storage and before it is brought into contact with the heated ore, and utilizing some of the gas for heating the ore.

6. An apparatus for effecting the generation of gas and the reduction of ore, comprising a gas producer, a gas cleaning and storing system into which the producer discharges, a reducing unit through which ore is passed in a finely divided state and while being agitated, means for supplying gas from the storage system to the reducing unit including a preheater for the gas, and means for conveying the gas after it has passed through the reducing unit back to the gas producer.

7. An apparatus for effecting the generation of gas and the reduction of ore, comprising a gas producer, a gas cleaning and storing system into which the producer discharges, a reducing unit through which ore is passed in a finely divided state and while being agitated, means for supplying gas from the storage system to the reducing unit including a preheater for the gas, means for conveying the gas after it has passed through the reducing unit back to the gas producer, the producer being of the retort type having a heating chamber, and means for conveying waste gases from the heating chamber to the gas preheater.

8. Apparatus for bringing reducing gas into intimate contact with finely divided ore particles, comprising an enclosing structure having a series of baffles therein arranged to produce a zig-zag flow of ore therethrough, means for supplying ore to the uppermost baffle of the series and means for removing ore from the lowermost baffle of the series, means for circulating reducing gas through the enclosing structure, and means for vibrating the unit to effect the travel and agitation of the ore particles.

9. An ore-reducing unit comprising a series of spaced baffle plates in the casing so arranged one below the other that material may fall from the outer edge of one baffle plate to the receiving edge of the next baffle plate, means for supplying reducing gas to the interior of the casing, means for permitting the removal of spent gases from the casing, and means for vibrating the structure to effect the movement and agitation of ore particles therethrough.

10. Apparatus for bringing finely divided solid particles into intimate contact with a gaseous medium, comprising a casing having a succession of baffle elements therein spaced one below the other and so arranged that material will move across one plate and fall onto the next succeeding plate and travel in an opposite direction over said next succeeding plate, means for introducing gas to the interior of the casing, and means for rapidly vibrating the casing to cause the flow of material over the baffle plates and to effect an agitation of the material.

11. An apparatus for bringing finely divided solid particles into intimate contact with a treating gas and adapted for continuous operation, comprising a vertical series of separated baffle plates, some of said baffle plates at least being so arranged that the finely divided solid material would normally repose thereon without flowing thereover, said plates being so arranged that material will discharge from the outer edge of one plate to the receiving edge of the next plate below it, means for introducing finely divided solid particles to the uppermost plate of the series, means for removing finely divided solid particles which have passed through the unit, means for circulating a gas through the unit, and means for vibrating the unit whereby the finely divided solid particles are caused to traverse the series of baffles.

12. A unit for bringing finely divided solid particles and a treating gas into intimate contact, comprising a casing enclosed at its top and bottom, a tubular member extending into the top of the casing and projecting from the bottom of the casing, a series of substantially horizontal plate members about the central tube member, a series of inclined plate members between the substantially horizontal ones, the inclination of said inclined plate members being toward the central tube member, the arrangement being such that material can discharge from the outer edges of the substantially horizontal plate members onto the inclined plate members, the inclined plate members having a passageway therethrough adjacent the central tube whereby material may fall from such inclined members onto the inner portion of the next succeeding substantially horizontal plate member, a substantially hopper-like member below the lowermost plate inclined also toward the central tube, the central tube having openings therein through which material received on the hopper-like member may pass into the tube to be discharged, the said central tube having an obstruction therein adjacent the uppermost substantially horizontal plate of the series and having openings therethrough immediately above said obstruction whereby solid material which is introduced into the top of the central tube can flow outwardly onto the uppermost baffle plate, means for vibrating said casing and tube with the baffle arrangement, and means for circulating gas through the casing.

13. A unit for bringing finely divided solid particles and a treating gas into intimate contact, comprising a casing enclosed at its top and bottom, a tubular member extending into the top of the casing and projecting from the bottom of the casing, a series of substantially horizontal plate members about the central tube member, a series of inclined plate members between the substantially horizontal ones, the inclination of said inclined plate members being toward the central tube member, the arrangement being such that material can discharge from the outer edges of the substantially horizontal plate members onto the inclined plate members, the inclined plate members having a passageway therethrough adjacent the central tube whereby material may fall from such inclined members onto the inner portion of the next succeeding substantially horizontal plate member, a substantially hopper-like member below the lowermost plate inclined also toward the central tube, the central tube having openings therein through which material received on the hopper-like member may pass into the tube to be discharged, the said central tube having an obstruction therein adjacent the uppermost substantially horizontal plate of the series and having openings therethrough immediately above said obstruction whereby solid material which is introduced into the top of the central tube can flow outwardly onto the uppermost baffle plate, means for vibrating said casing and tube with the baffle arrangement, means for circulating gas through the casing, and means for applying heat to the exterior of the casing.

14. Apparatus for bringing gas and finely divided solid particles into intimate contact, comprising a casing, a succession of spaced fixed baffles in the casing arranged in a vertical series, some of the baffles being so arranged that finely divided solid particles would normally repose thereon, and means for jarring or vibrating the baffles on which the material reposes to produce gravity flow of material over the baffles, said baffles being arranged for discharge of material from one to another and so on through the unit, and means for circulating gas through the unit.

15. Apparatus for bringing gas and finely divided solid particles into intimate contact, comprising a casing, a series of baffles arranged therein for downward flow of solid particles in a zig-zag path, means for vibrating or jarring the baffles to produce flow of the particles over the baffles, and means for circulating gas through the casing in a direction counter to the direction of flow of the solid particles.

16. A unit for bringing finely divided solid particles into intimate contact with a gas, comprising a casing having a series of baffles therein so arranged as to effect a zig-zag flow of solid particles therethrough only when the structure is being rapidly vibrated, means for conducting a reducing gas through the casing in a direction counter to the direction of flow of the solid particles, and means for vibrating the structure.

17. A unit for bringing finely divided solid particles into intimate contact with a gas, comprising a casing having a series of baffles therein so arranged as to effect a zig-zag flow of solid particles therethrough only when the structure is being rapidly vibrated, means for conducting a reducing gas through the casing in a direction counter to the direction of flow of the solid particles, means for vibrating the structure, and means for applying heat to the structure externally thereof.

18. A unit for bringing an oxide-bearing ore in a finely divided state into intimate contact with a reducing gas for effecting reduction of the ore, comprising a casing having ore-conveying means therein effective only when the unit is being vibrated and so arranged as to cause a tortuous travel of the ore particles therethrough, and means for maintaining a flow of reducing gas over and through the ore counter to the direction of travel of the ore, means for applying heat to the unit to maintain a reaction temperature within the unit, and means for vibrating the unit.

19. A unit for bringing solid particles and reducing gas into intimate contact, comprising an enclosing shell forming a chamber, a supporting member in the chamber, a vertical series of baffles carried thereby and so arranged that material may cascade thereover, means for transmitting vibrations to the supporting structure and the baffles carried thereby, and means for circulating reducing gas within said chamber.

20. A unit for bringing solid particles and reducing gas into intimate contact, comprising an enclosing shell forming a chamber, a supporting member in the chamber carrying a vertical series of baffles so arranged that material may spread out in layers over the surfaces of the baffles and may flow from an upper baffle onto the next succeeding lower one, means for transmitting vibrations to the supporting structure and the baffles carried thereby, said supporting structure being so arranged that it can vibrate substantially independently of the shell forming the enclosing chamber, and means for circulating reducing gas within said chamber.

21. A unit for bringing finely divided solid materials into intimate contact with a gas, comprising an enclosure, means including a descending series of baffles for sifting the solid particles downwardly through the enclosure in a thinly spread condition and at a controlled rate of speed, some of the baffles being disposed at such an angle that the solid material may repose thereon, means for vibrating the said baffles on which the material may repose to effect discharge of the material therefrom, and means for passing a current of gas through the enclosure counter to the flow of solid particles.

JAMES A. BRADLEY.